(12) United States Patent
Tyan et al.

(10) Patent No.: US 9,267,669 B2
(45) Date of Patent: Feb. 23, 2016

(54) LUMINANCE ENHANCEMENT FILM, BACKLIGHT MODULE AND LIQUID CRYSTAL DISPLAY DEVICE

(71) Applicant: UBRIGHT OPTRONICS CORPORATION, Taoyuan (TW)

(72) Inventors: Yi-Long Tyan, Taoyuan (TW); Chia-Yi Chen, Taoyuan (TW); Yu-Mei Juan, Taoyuan (TW); Lung-Pin Hsin, Taoyuan (TW); Hui-Yong Paul Chen, Taoyuan (TW)

(73) Assignee: UBright Optronics Corporation, Taoyuan (TW)

( * ) Notice: Subject to any disclaimer, the term of this patent is extended or adjusted under 35 U.S.C. 154(b) by 426 days.

(21) Appl. No.: 13/767,424

(22) Filed: Feb. 14, 2013

(65) Prior Publication Data

US 2014/0133133 A1 May 15, 2014

(30) Foreign Application Priority Data

Nov. 14, 2012 (TW) .............................. 101142390 A

(51) Int. Cl.
| | |
|---|---|
| *F21V 15/04* | (2006.01) |
| *F21V 5/02* | (2006.01) |
| *G02B 5/04* | (2006.01) |
| *F21V 8/00* | (2006.01) |

(52) U.S. Cl.
CPC . *F21V 15/04* (2013.01); *F21V 5/02* (2013.01); *G02B 5/045* (2013.01); *G02B 6/0053* (2013.01)

(58) Field of Classification Search
CPC .................... G02F 1/133615; G02F 1/133603; G02F 2001/133614; G02F 1/133308; G02F 1/133605; G02F 1/1336; G02F 1/133602; G02F 1/133504; G02B 6/0053; G02B 6/0055; G02B 6/0051; G02B 5/0205; G02B 5/04; G02B 5/045; G02B 6/0063; B32B 27/36; G09F 13/04; H05K 5/0017; G01D 11/28; F21V 5/02; F21V 15/04
USPC ............ 349/65, 64; 362/97.1, 602, 609, 97.3, 362/97.2; 348/790; 359/599; 345/87
See application file for complete search history.

(56) References Cited

U.S. PATENT DOCUMENTS

| | | | |
|---|---|---|---|
| 5,995,288 A | 11/1999 | Kashima et al. | |
| 6,280,063 B1 | 8/2001 | Fong et al. | |
| 2004/0228106 A1* | 11/2004 | Stevenson et al. | ............. 362/31 |
| 2008/0151549 A1 | 6/2008 | Hsu | |
| 2008/0310171 A1* | 12/2008 | Hiraishi et al. | ............... 362/339 |

* cited by examiner

*Primary Examiner* — Stephen F Husar
*Assistant Examiner* — Danielle Allen
(74) *Attorney, Agent, or Firm* — Min-Lee Teng; Litron Patent & Trademark Office

(57) ABSTRACT

The present invention provides a luminance enhancement film which is superior in dimensional stability, thermal stability, and anti-deformation ability. Thus, it can meet the current requirement for thinning LCD apparatuses.

With regard to the luminance enhancement film, a prism row structure is formed on a surface of a substrate, and a reinforced layer is formed on the other surface of the substrate. The glass transition temperature of the reinforced layer is in the range from 80° C. to 250° C., and the thickness of that is in the range from 3 μm to 50 μm.

20 Claims, 5 Drawing Sheets

LUMINANCE ENHANCEMENT FILM, BACKLIGHT MODULE AND LIQUID CRYSTAL DISPLAY DEVICE

BACKGROUND OF THE INVENTION

1. Field of the Invention

The present invention relates to an optical film with a reinforced layer, particularly to the optical film with superior in thermal stability, dimensional stability and anti-deformation ability.

2. Description of Related Art

With the advancement of technology, in order to meet people's needs for light, thin, short and small electronic digital products, it prompted the development of the thickness of liquid crystal display panel to become thinner and more lightweight so as to achieve a lightweight and thin electronic digital products which are easy to carry. An efficient way to achieve this goal is to make the backlight module thinner.

The fundamental structure of a common backlight module except the light source includes (from bottom to top): reflective sheet, light guiding plate, lower diffusion sheet, lower luminance enhancement film, upper luminance enhancement film and upper diffusion sheet. In order to reduce the thickness of the backlight module, the existing methods in the industry are as follow: (1) using a multi-functional composite sheet material, i.e., integrating parts of the optical films mentioned above into one composite sheet, for example, combining the upper diffusion sheet with upper luminance enhancement film into one upper luminance enhancement composite sheet; (2) reducing the thickness of each optical film, and thus achieving the purpose of reducing the total thickness thereof, for example, changing the luminance enhancement film used for notebook computers from the original substrate whose thickness is 125 μm into the replaced substrate whose thickness is 100 μm, or even 75 μm.

However, in adopting the above-mentioned method (2), particularly using the substrate with thinner thickness, there would be the following problem. When, using a substrate with, a large area to produce a large-size panel, the rigidity of the substrate will become insufficient and thus easily cause deformation. In addition, when the light source of the backlight module is of edge light, the heat is easy to concentrate on the specific location at the edge of the backlight module, causing that the temperature at the edge of the backlight module would be higher than that in other portion of the backlight module and then making the edge of the substrate easily deform due to the high temperature, thereby re-suiting in some problems, such as warp, corrugation, unevenness. This problem would be more apparent on the substrate with thinner thickness.

As to prior arts about applying coating layer on the specific layer of the backlight module to achieve unique purposes, there are some examples as follows.

First, U.S. Pat. No. 5,995,288 (hereinafter, referred to as "PD1") discloses an optical sheet in which a resin coating layer is disposed on a side of the substrate opposite to the side forming unit prisms. The coating layer has a thickness in the range from 2 μm to 20 μm and contains particles whose particle diameter is in the range from 1 μm to 10 μm, whereas the ratio of the refractive index of the particles to the refractive index of the resin forming the coating layer is in the range from 0.9 to 1.1. With this structure, a purpose for preventing the Newton's rings can be achieved.

In addition, U.S. Pat. No. 6,280,063 (hereinafter, referred to as "PD2") discloses a brightness enhancement article in which a first major surface of the substrate forms an array of prisms while a second major surface of the substrate forms a light scattering layer. This light scattering layer has a thickness in the range from 1 to 50 μm and contains a plurality of components projecting from the second major surface. Additionally, the haze value of this brightness enhancement article is in the range from 20 to 60% and transmittance is not greater than 94%, whereby the brightness enhancement article can maintain a brightness enhancement characteristic and an extinction characteristic as well.

Furthermore, US 2008/0151549 (hereinafter, referred to as "PD3") discloses a scratch-resistant optical film in which a hard coating layer is provided on the surface of the reflective substrate as a scratch-resistant layer. The scratch-resistant, layer has a surface resistivity in the range from $10^8 \Omega/\square$ to $10^{12} \Omega/\square$, a thickness in the range from 1 μm to 20 μm; and contains organic particles whose particle diameter is in the range from 0.1 μm to 10 μm. Based on this structure, the reflective substrate has low shrinkage ability, hardly warps and has a good antistatic and high hardness, wherein the reflective substrate may have excellent scratch resistance due to the high hardness.

SUMMARY OF THE INVENTION

Although above-mentioned PD1 and PD2 disclose the relevant technique that a coating layer containing specific particles are formed on the back surface of a luminance enhancement layer, they pay attention to preventing the Newton's rings or imparting extinction, characteristic but do not do study on improving the rigidity and dimensional stability of the luminance enhancement film itself. In addition, although PD3 discloses that the hard coating layer is disposed on the surface of the reflective substrate to prevent the reflective substrate from warping and enhance its hardness thereby providing excellent scratch resistance, it mainly makes the improvement on reflective layer of the backlight unit but not on the luminance enhancement film.

In summary, existing technique does not effectively solve the problem encountered when adopting the thinner luminance enhancement film to the display with a larger size. Therefore, in the market, an effective method is urgently needed to reinforce the stability of the luminance enhancement film so as to meet the requirement of stability of the luminance enhancement film used in backlight module.

In consideration of the subject mentioned above, the purpose of the present invention is to provide a luminance enhancement film in which a prism row structure is formed on a surface of the substrate and a reinforced layer is formed on another surface of the substrate. Said reinforced layer has a glass transition temperature (Tg) in the range from 80° C. to 250° C. and a thickness in the range from 3 μm to 50 μm.

Further, the present invention, also provides a backlight module using the luminance enhancement film mentioned above and a liquid crystal display with this backlight module.

According to the present invention, the thermal stability, dimensional stability and anti-deformation ability can be improved because the reinforced layer with high glass transition, temperature (Tg) and suitable thickness is provided on the luminance enhancement film so that the luminance enhancement will not appear warp, corrugation and unevenness after being lightened and then overheated. At the same time, the rigidity of the luminance enhancement film will be raised and thus the luminance enhancement film can be used in the panel with a larger size, and the problem generally encountered, such as deformation and bad thermal stability, can be solved.

DETAILED DESCRIPTION OF THE INVENTION

Figure 1:
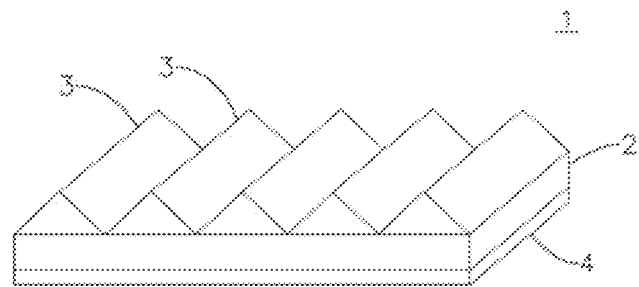
FIG. 1 is a perspective view of an embodiment of a luminance enhancement film according to the invention.

The detailed description for the fundamental structure and efficacy of the luminance enhancement film according to present invention is as follows. As shown in FIG. 1, in the luminance enhancement film 1 according to the invention, a prism row structure 3 is formed on a surface of a substrate 2 and a reinforced layer 4 is formed on another surface (back surface) of the substrate which is the surface opposite to the surface forming the prism row structure 3 thereon.

In addition to polyethylene terephthalate (PET), the plastic optical films, such as polycarbonate (PC), polyethylene naphthalate (PEN), (metallocene) cyclic olefin copolymer (mCOC), polyarylate (PAR), polyethersulfone (PES), triacetate cellulose (TAC), polymethyl methacrylate (PMMA), can be used as the material of substrate 2. Additionally, the thickness of the substrate 2 to be used is in the range from 25 µm to 300 µm.

The prism row structure 3 is composed of a plurality of prism units (prism row). FIG. 1 illustrates that a plurality of prism units each generally in triangle cylinder shape are arranged side by side to each other on the surface of the substrate 2, but the arrangement of the prism units is not limited to this case. The structure including the shape, size of the prism unit, the spacing between the prism units and arrangement of the prism units may adopt common conventional structure.

The reinforced layer 4 according to the invention will be described in the following. According to the conventional technique, under the situation that the luminance enhancement film of the backlight module becomes thinner and is used in a large size panel, the dimensional stability will be affected due to the uneven distribution, on the luminance enhancement film, of the heat generated by the light source so as to occur the problems of warp, corrugation and uneven deformation of the luminance enhancement film, and thus deteriorate the lighting uniformity of the whole backlight module. In order to solve this problem, the present invention contemplates that the reinforced layer 4 is further provided on the luminance enhancement film 1. This reinforced layer 4 is mainly characterized in having a specific glass transition temperature (Tg) and a specific thickness.

With respect to the glass transition temperature (Tg) of the reinforced layer 4, it is preferably in the range from 80° C. to 250° C., more preferably from 100° C. to 200° C. When Tg is lower than 80° C., the thermal stability and dimensional stability of the reinforced layer 4 under high temperature will become insufficient so as to hardly prevent the luminance enhancement film from appearing warp, corrugation and unevenness. On the other hand, when Tg is higher than 250° C., the thermal stability of the reinforced layer 4 can sufficiently remain but the cost of manufacturing material will become very high, not meeting the economic efficiency.

With respect to the thickness of the reinforced layer 4, it is preferably in the range from 3 µm to 50 µm. If the thickness of the reinforced layer 4 is lower than 3 µm, the rigidity, thermal, stability and dimensional stability of the luminance enhancement film 1 will be insufficient. On the other hand, if the thickness of the reinforced layer 4 is greater than 50 µm, the total thickness of the luminance enhancement film 1 will become too thick to facilitate the thinning of the backlight module as well as liquid crystal display device. In addition, the thickness of the reinforced layer 4 is preferably concurrently considered with the thickness of the substrate 2. In principle, when the thicker substrate 2 is used, the thickness of the reinforced layer 4 is needed to increase correspondingly.

As the material for reinforced layer 4, all materials can be used without any special limit as long as their glass transition temperature (Tg) is in the range from 80° C. to 250° C., such as epoxy resins, acrylic copolymers which are copolymerized from aliphatic acrylic mono- or oligomers and aromatic multifunctional acrylic mono- or oligomers, and acrylic copolymers which are copolymerized from aromatic acrylic mono- or oligomers and aliphatic multifunctional acrylic mono- or oligomers.

Further, the refractive index of the reinforced layer 4 is preferably in the range from 1.3 to 1.6 for the reason that the reinforced layer 4 with the refractive index from 1.3 to 1.6 disposed between the substrate 2 (such as PET, PC) with high refractive index and the air with low refractive index could generate the effect similar to the anti-reflective layer so that the incident light can be more effectively into the luminance enhancement film 1 and be condensed, whereby the brilliance of the luminance enhancement film 1 is raised.

Figure 2:
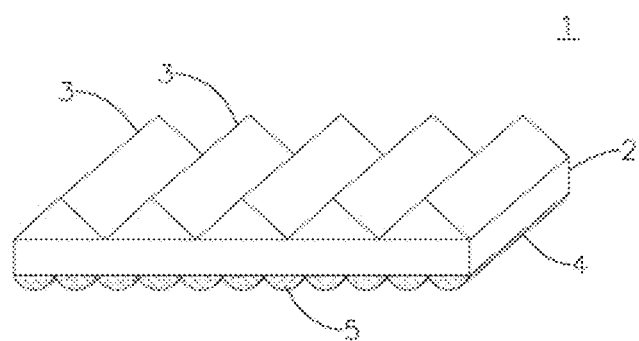
FIG. 2 is a perspective view of another embodiment of a luminance enhancement film according to the invention.

The reinforced layer 4 can be not only formed as flat surface (without unique texture) as shown in FIG. 1, but also cars be formed as a specific pattern by embossing technique, as shown in FIG. 2 which illustrates that the reinforced layer 4 formed as an array of a plurality of semi-cylinders. Further, specific particles 5 can be added to the reinforced layer 4 as desired to achieve specific efficacies, such as eliminating Newton's rings, enhancing light-shielding ability, enhancing the hardness of the back surface of the luminance enhancement film to increase scratch-resistant ability, and providing the function of diffusion.

Figure 3:
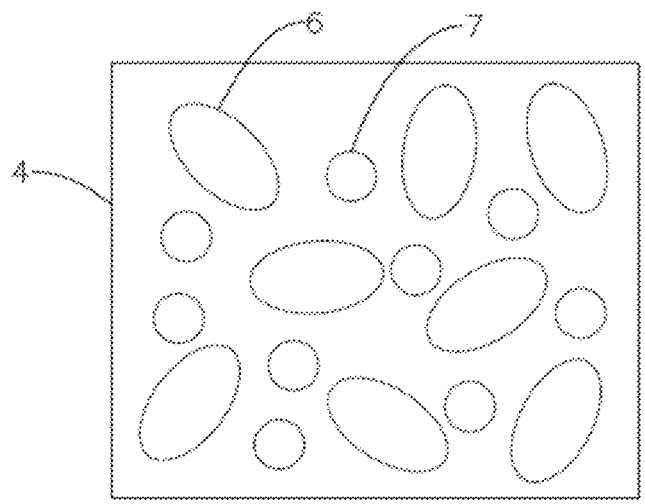
FIG. 3 is a schematic diagram of an example of a reinforced layer forming a special structure according to the invention.
Figure 4:
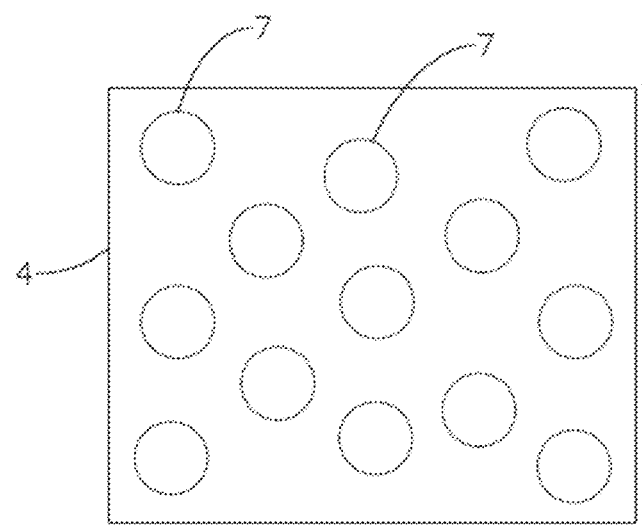
FIG. 4 is a schematic diagram of another example of a reinforced layer forming a special structure according to the invention.

Meanwhile, the other embodiments of the specific patterns of the reinforced layers 4, in addition to the one shown in FIG. 2, are illustrated in FIG. 3 and FIG. 4 for example, FIG. 3 shows that semi-elliptical bodies 6 and hemispherical bodies 7 in a relative smaller size project from the surface of the reinforced layer 4. FIG. 4 shows that hemispherical bodies 7 in the same size project from the surface of the reinforced layer 4. However, the present invention is not limited to these examples. For instance, in FIG. 3, the semi-elliptical bodies 6 can also be smaller than the hemispherical, bodies 7 and each, hemispherical body 7 in FIG. 4 can have different size. Further, the shape of the bodies projecting from the surface of the reinforced, layer 4 also can be in any other shapes, e.g. triangular prism or irregular shape, while the arrangement of the projecting bodies can be regular or random.

Organic material (such as PMMA, PS, PU), inorganic (such as $SiO_2$, $TiO_2$, $Al_2O_3$, ZnO and glass), or the mixture thereof can be used as the aforesaid particles 5. In addition, the particle diameter of the particles 5 is preferable in the range from 1 μm to 20 μm in order to achieve the aforesaid efficacies, i.e., eliminating Newton's rings, enhancing light-shielding ability and providing the function of diffusion.

A method for manufacturing the luminance enhancement film 1 according to the present invention is described as follows: (a) first, preparing a substrate 2 cut in a set size; (b) then making the surface of the substrate 2 for forming a reinforced layer face upwardly; (c) coating a material (e.g. aliphatic or aromatic multifunctional acrylic oligomers and acrylic monomers with low volatility and low viscosity, photoinitiator and optionally other adding components (e.g., leveling agent)) for forming the reinforced layer with a certain, thickness on the substrate 2; (d) irradiating the material to form the reinforced layer by UV light for a set time; (e) turning the surface of the substrate 2 for forming a prism row structure to face upwardly; (f) coating a material (e.g., acrylic monomers or oligomers) for forming the prism row structure on the substrate 2; and (g) irradiating the material by UV light for a set time in coordination with, for example, embossing technique to form the prism row structure 3, thereby completing the manufacture of the luminance enhancement film 1. In addition, if it is desired to form special texture on the reinforced layer 4, the material is likely irradiated by UV light in coordination with, for example, embossing technique to form the desired pattern after coating the material for reinforced layer on the substrate 2. Further, if it is desired to make the reinforced layer 4 contain the aforesaid organic particles and/or inorganic particles 5, said particles 5 can be pre-added to the material for forming the reinforced layer and then the material together with the particle 5 is coated on the surface of the substrate 2 and then is cured so as to obtain the reinforced layer 4 containing specific particles 5. Additionally, of course, the sequence of forming reinforced, layer 4 and prism row structure 3 is not limited to the above-mentioned method. The reinforced layer 4 can be formed after the prism row structure 3 is first formed on the substrate 2.

Because the reinforced layer 4 with specific properties is further added to the luminance enhancement film 1, under various conditions, the dimensional stability, thermal stability and the anti-deformation ability of the luminance enhancement film 1 according to present invention can be improved. Meanwhile, said luminance enhancement film 1 can be used under more critical condition, whereby the luminance enhancement film 1 can be used in a large-sized device and a device in which the heat distribution is not uniform, particularly edge-lit liquid crystal display, to meet the requirement of the device to resist deformation. Additionally, not only the stability of the luminance enhancement film can be raised by selecting the reinforced layer with a specific refractive index, but also the brilliance gain of the luminance enhancement film can be increased, and thus the luminance enhancement film is multi-functional.

EXAMPLES

The manufacturing method and way to determine the properties of the luminance enhancement film according to the present invention are described as follows:

I. Manufacturing Method of the Luminance Enhancement Film

Example 1

After bisphenol A epoxy resin (CN104, manufactured by Sartomer Inc.) of 6 wt %, dipentaerythritol hexaacrylate of 45 wt %, pentaerythritol triacrylate of 45 wt. %, photoinitiator 184 (IRGACURE 184, manufactured by BASF Inc.) of 4 wt. % are mixed at room temperature for 4 hours, the analysis of liquid refractive index is performed. Then, after the mixture is coated on the back surface of PET (substrate) whose thickness is 75 μm while the thickness of the mixture is controlled in a certain, range (5±0.5 μm), it is irradiated by UV light at 300 mJ/cm$^2$ to make it be cured to form the reinforced layer. And then a prism row structure (a plurality of prism rows in triangle cylinder shape, 24 μm spacing between the prisms, 16±3 μm in height of the prisms) on the surface of the substrate is produced and the luminance enhancement film of Example 1 is obtained. The Tg analysis of the reinforced layer and the shrinkage rate analysis of the luminance enhancement film are performed, and the result is listed in Table 1 below.

Example 2

After hexafunctional aliphatic urethane acrylate (PU610, manufactured by Miwon Inc.) of 24 wt. %, tripropylene glycol diacrylate of 48 wt. %, pentaerythritol triacrylate of 24 wt. % and photoinitiator 184 (IRGACURE 184, manufactured by BASF Inc.) of 4 wt. % are mixed at room temperature for four hours, the analysis of liquid refractive index is performed. Then, after the mixture is coated on the back surface of PET (substrate) whose thickness is 75 μm while the thickness of the mixture is controlled in a certain range (5±0.3 μm), it is irradiated by UV light at 300 mJ/cm$^2$ to make it be cured to form the reinforced layer. And then a prism row structure (a plurality of prism rows in triangle cylinder shape, 24 μm spacing between the prisms, 16±3 μm in height of the prisms) on the surface of the substrate is produced and the luminance enhancement film of Example 2 is obtained. The Tg analysis of the reinforced layer and the shrinkage rate analysis of the luminance enhancement film are performed, and the result is listed in Table 1 below.

Example 3

After hexafunctional aliphatic urethane acrylate (PU610, manufactured by Miwon Inc.) of 32 wt. %, pentaerythritol triacrylate of 16 wt. %, tripropylene glycol diacrylate of 32 wt. %, tricyclodecanedimethanol diacrylate of 16 wt. %, and photoinitiator 184 (IRGACURE 184, manufactured by BASF Inc.) of 4 wt % are mixed at room temperature for four hours, the analysis of liquid refractive index is performed. Then, after the mixture is coated on the hack surface of PET (substrate) whose thickness is 75 μm while the thickness of the mixture is controlled in a certain range (5±0.5 μm), it is irradiated by UV light at 300 mJ/cm$^2$ to make it be cured to form the reinforced layer. And then a prism row structure (a plurality of prism, rows in triangle cylinder shape, 24 μm spacing between the prisms, 16±3 μm in height of the prisms) on the surface of the substrate is produced and the luminance enhancement film of Example 3 is obtained. The Tg analysis of the reinforced layer and the shrinkage rate analysis of the luminance enhancement film are performed, and the result is listed in Table 1 below.

Comparative Example 1

After tetrafunctional aromatic methane acrylate (PU460, manufactured by Miwon Inc.) of 28 wt. %, tripropylene glycol, diacrylate of 42 wt. %, pentaerythritol triacrylate of 26 wt. % and photoinitiator 184 (IRGACURE 184, manufactured by BASF Inc.) of 4 wt. % are mixed at room temperature for four hours, the analysis of liquid refractive index is performed. Then, after the mixture is coated on the back surface of PET (substrate) whose thickness is 75 μm while the thickness of the mixture is controlled in a certain range (5±0.5 μm), it is irradiated by UV light at 300 mJ/cm² to make it be cured to form the reinforced layer. And then a prism row structure (a plurality of prism rows in triangle cylinder shape, 24 μm spacing between the prisms, 16±3 μm in height of the prisms) on the surface of the substrate is produced and the luminance enhancement film of Comparative Example 1 is obtained. The Tg analysis of the reinforced layer and the shrinkage rate analysis of the luminance enhancement film are performed, and the result is listed in Table 1 below.

Comparative Example 2

After tetrafunctional aromatic methane acrylate (PU460, manufactured by Miwon Inc.) of 28 wt. %, tripropylene glycol diacrylate of 42 wt. %, pentaerythritol triacrylate of 26 wt % and photoinitiator 184 (IRGACURE 184, manufactured by BASF Inc.) of 4 wt. % are mixed at room temperature for four hours, the analysis of liquid refractive index is performed. Then, alter the mixture is coated on the hack surface of PET (substrate) whose thickness is 125 μm while the thickness of the mixture is controlled in a certain range (16±1 μm), it is irradiated by UV light at 300 mJ/cm² to make it be cured to form the reinforced layer is formed. And then a prism row structure (a plurality of prism rows in triangle cylinder shape, 24 μm spacing between the prisms, 16±3 μm in height of the prisms) on the surface of the substrate is produced and the luminance enhancement film of Comparative Example 2 is obtained.

Comparative Example 3

Identical to Examples 1 to 3 except forming the reinforced layer on the back surface of the PET substrate, the prism row structure is formed on the surface of the PET substrate. The luminance enhancement film of Comparative Example 3 is thus obtained.

Example 4

Bisphenol A epoxy resin (CN104, manufactured, by Sartomer Inc.) of 6 wt %, dipentaerythritol hexaacrylate of 45 wt. %, pentaerythritol triacrylate of 45 wt. %, photoinitiator 184 (IRGACURE 184, manufactured by BASF Inc.) of 4 wt. % are mixed at room temperature for lour hours. Then, after the mixture is coated on the back surface of PET (substrate) whose thickness is 125 μm while the thickness of the mixture is controlled in a certain range (5±0.5 μm), it is irradiated by UV light at 300 mJ/cm² to make it be cured to form the reinforced layer. And then a prism row structure (a plurality of prism rows in triangle cylinder shape, 50 μm spacing between the prisms, 30±3 μm in height of the prisms) on the surface of the substrate is produced and the luminance enhancement film of Example 4 is obtained.

Comparative Example 4

Bisphenol A epoxy resin (CN104, manufactured by Sartomer Inc.) of 6 wt. %, dipentaerythritol hexaacrylate of 45 wt. %, pentaerythritol triacrylate of 45 wt. %, photoinitiator 184 (IRGACURE 184, manufactured by BASF) of 4 wt. % are mixed at room temperature for four hours. Then, after the mixture is coated on the back surface of PET (substrate) whose thickness is 125 μm while the thickness of the mixture is controlled in a certain range (2.5±0.5 μm), it is irradiated by UV light at 300 mJ/cm² to make it be cured to form the reinforced layer. And then a prism row structure (a plurality of prism rows in triangle cylinder shape, 50 μm spacing between the prisms, 30±3 μm in height of the prisms) on the surface of the substrate is produced and the luminance enhancement film of Comparative Example 4 is obtained.

II. Glass Transition Temperature (Tg) Test of Reinforced Layer

Ramped temperature scanning analysis is performed on the luminance enhancement films of Examples 1 to 3 and Comparative Example 1 by Differential Scanning Calorimeter (DSC Q2000) from 40° C. to 150° C. at ramped temperature rote (10° C./min) to determine each glass transition temperature (Tg).

III. Refractive Index Test

Each refractive index test is performed on the mixtures of the luminance enhancement films of Examples 1 to 3 and Comparative Example 1, which are not crosslinkingly reacted yet, by Abbe refractometer (C9W-2WAJ) at room temperature.

IV. Shrinkage Rate Test

Each reinforced layer of the luminance enhancement films of Examples 1 to 3 and Comparative Example 1 is weighted for 2 gram and then the shrinkage rate of each weighted reinforced layer is measured by densimeter (MH-300S) at room temperature.

TABLE 1

|  | Example 1 | Example 2 | Example 3 | Comparative Example 1 |
|---|---|---|---|---|
| Refractive index | 1.496 | 1.465 | 1.482 | 1.572 |
| Tg (° C.) | 87 | 105 | 133 | 63 |
| Shrinkage rate (%) | 4.72 | 5.06 | 5.56 | 3.66 |

V. Observation, on Warp and Corruption of Luminance Enhancement Film

Figure 5A:
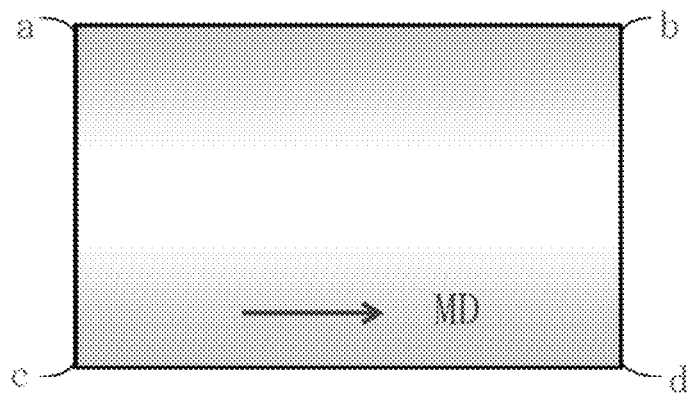
FIG. 5A is a schematic diagram showing an observation on whether a part of the luminance enhancement film warps or not.
Figure 5B:
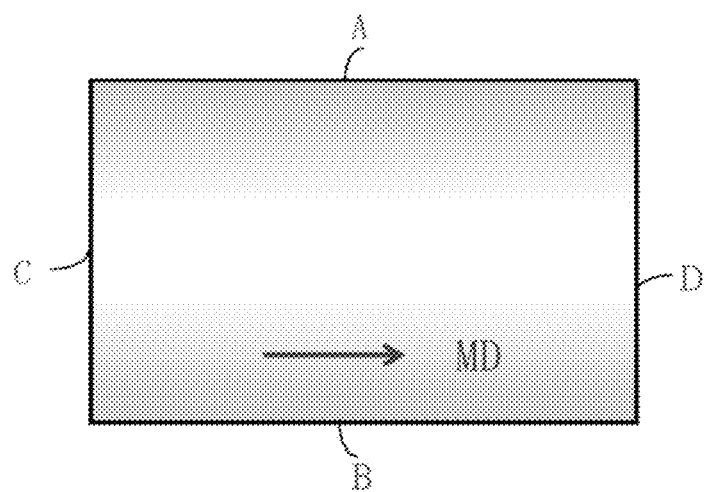
FIG. 5B is a schematic diagram showing an observation on whether a part of the luminance enhancement film appears corrugation or not.

The luminance enhancement films of above-mentioned Examples 1 to 3 and Comparative Examples 1 to 3 are cut at a constant size (297 mm×210 mm). The warps of the four corners (see FIG. 5A) and the corrugations of four edges (see FIG. 5B) of these luminance enhancement films are measured and recorded. Then, after these luminance enhancement films are placed into the environmental testing machine at 85° C.

for 24 hours, they am withdrawn from the machine and placed, on a marble counter for ten minutes, followed by measuring and recording the warps of the four corners and the corrugations of the four edges. Finally, on the luminance enhancement films with a reinforced layer (Example 1 to 3 and Comparative Example 1 to 2) and without a reinforced layer (Comparative Example 3) and on the luminance enhancement films with different reinforced layer (Examples 1 to 3 and Comparative Examples 1 to 2), the warp and corrugation changes before and after high temperature reliability test are compared and analyzed. The results are listed in Table 2 and Table 3.

On the other hand, after high temperature reliability test, the warp amount of the luminance enhancement film of Comparative Example 1 is in the range from 3 mm to 16 mm for the possible reason that said luminance enhancement film has a low shrinkage rate. Therefore, said luminance enhancement film with the reinforced layer whose thickness is identical to the reinforced layers of the luminance enhancement films of Examples 1 to 3 has poorer anti-warp ability. Further, after high temperature reliability test, the edge corrugation level of said luminance enhancement film is up to the range from 2 mm to 2.3 mm and is obviously higher than the luminance enhancement films of Examples 1 to 3 for the possible reason

TABLE 2

|  | Thickness of reinforced layer (μm) | Amount of warp (mm) | | | | | | | |
|---|---|---|---|---|---|---|---|---|---|
|  |  | Before reliability test | | | | After reliability test | | | |
|  |  | Corner a | Corner b | Corner c | Corner d | Corner a | Corner b | Corner c | Corner d |
| Example 1 | 5 ± 0.5 | −0.2 | 0.0 | 0.0 | −0.3 | 6.4 | 8.5 | 8.8 | 7.5 |
| Example 2 | 5 ± 0.5 | −0.1 | 0.0 | 0.0 | −0.2 | 4.0 | 8.0 | 8.0 | 6.0 |
| Example 3 | 5 ± 0.5 | −0.1 | 0.0 | 0.0 | −0.1 | 2.0 | 7.0 | 6.0 | 4.0 |
| Comparative Example 1 | 5 ± 0.5 | 0.0 | 0.5 | 0.3 | 0.3 | 3.0 | 16.0 | 13.0 | 4.0 |
| Comparative Example 2 | 16 ± 1 | −0.2 | 0.0 | 0.0 | 0.0 | 3.7 | 4.5 | 3.7 | 2.3 |
| Comparative Example 3 | — | 0.0 | 0.3 | 0.3 | 0.0 | 12.0 | 20.0 | 18.0 | 8.0 |

TABLE 3

|  | Thickness of reinforced layer (μm) | Amount of corrugation (mm) | | | | | | | |
|---|---|---|---|---|---|---|---|---|---|
|  |  | Before reliability test | | | | After reliability test | | | |
|  |  | Edge A | Edge B | Edge C | Edge D | Edge A | Edge B | Edge C | Edge D |
| Example 1 | 5 ± 0.5 | 0.0 | 0.0 | 0.0 | 0.0 | 0.8 | 1.3 | 0.0 | 0.0 |
| Example 2 | 5 ± 0.5 | 0.0 | 0.0 | 0.0 | 0.0 | 0.5 | 1.0 | 0.0 | 0.0 |
| Example 3 | 5 ± 0.5 | 0.0 | 0.0 | 0.0 | 0.0 | 0.0 | 0.5 | 0.0 | 0.0 |
| Comparative Example 1 | 5 ± 0.5 | 0.3 | 0.5 | 0.3 | 0.5 | 2.0 | 2.3 | 0.0 | 0.0 |
| Comparative Example 2 | 16 ± 1 | 0.3 | 0.2 | 0.3 | 0.3 | 1.0 | 1.3 | 0.0 | 0.0 |
| Comparative Example 3 | — | 0.3 | 0.0 | 0.0 | 0.0 | 3.0 | 2.5 | 0.0 | 0.0 |

As seen from Tables 2 and 3, before high temperature reliability test, the luminance enhancement films of Examples 1 to 3 do not appear obvious warp or corrugation. In addition, after the high temperature reliability test (85° C./24 hours), the sheet of the luminance enhancement film of Example 1 warps in the range from 6.4 mm to 8.8 mm and its maximum corrugation is about 1.3 mm. After the high temperature reliability test (85° C./24 hours), the sheet of the luminance enhancement film of Example 2 warps in the range from 4 mm to 8 mm and its maximum corrugation is about 1 mm. After the high temperature reliability test (85° C./24 hours), the sheet of the luminance enhancement film of Example 3 warps in the range from 2 mm to 7 mm and its maximum corrugation is about 0.5 mm. As to these results, the anti-warp ability of the luminance enhancement films of Examples 1 to 3 mainly depends on the shrinkage rate of the reinforced layer such that the luminance enhancement films of Examples 1 to 3 have similar shrinkage rate and so does their anti-warp ability. Further, compared with the luminance enhancement films of Examples 1 and 2, luminance enhancement film of Example 3 has better anti-corrugation ability.

that the reinforced layer of the luminance enhancement film of Comparative Example 1 has a lower Tg and thus the heat resistant ability and thermal stability of the luminance enhancement film to be obtained is both bad. Further, although after high temperature reliability test, the warp level of the luminance enhancement film of Comparative Example 2 is reduced to the range from 2.3 mm to 4.5 mm, the corrugation level reaches a value in the range from 1 mm to 1.3 mm which is larger than that of the luminance enhancement films of Examples 1 to 3. This result shows that the heat resistant and anti-deformation abilities of the luminance enhancement him which uses a high Tg material for reinforced layer with a lower thickness is much better than the luminance enhancement film using a low Tg material for reinforced layer.

Further, for the luminance enhancement film of the Comparative Example 3 on which the reinforced layer is not coated, the amount of warp is up to the range from 8 mm to 20 mm and the maximum corrugation is up to 3 mm after high temperature reliability test. Both warp level and corrugation, level do not meet the specification requirement accepted by the industry.

To sum up the results shown above, the dimensional stability and thermal stability of the product will be improved and the anti-deformation ability of the product under various conditions will also be increased when the luminance enhancement film has the reinforced layer. The reinforced layer which can achieve these efficacies depends on two factors. One factor is the Tg of the reinforced layer. When the Tg of the reinforced layer is higher, the effect of thermal stability which the reinforced layer can improve is better. As seen from the above-mentioned results, when the Tg of the reinforced, layer is higher than 87° C., good thermal stability can be provided. The other factor is the thickness of the reinforced layer. When the reinforced layer with the Tg higher than 87° C. is used on thin substrate, good effect can be achieved even if the thickness of the reinforced layer is about 5 μm.

(Test (1) for Luminance Enhancement Film Assembled in the Backlight Module).

The luminance enhancement films of Examples 1 to 3 and Comparative Examples 1 and 3 after cut into 12-inch in size are assembled in the 12-inch backlight module. After the backlight module is lightened for ten minutes, the luminance enhancement films are taken from the backlight module. The state and level of the corrugations on the surface of said films are observed and the results are listed in Table 4 below.

TABLE 4

|  | Example 1 | Example 2 | Example 3 | Comparative Example 1 | Comparative Example 3 |
|---|---|---|---|---|---|
| Corrugation level | 2 | 1 | 0 | 4 | 5 |
| Corrugation number | 2 | 2 | 0 | 4 | 6 |
| Corrugation level × Corrugation number | 4 | 2 | 0 | 16 | 30 |

Note 1:
corrugation level of luminance enhancement film is estimated from no corrugation (defined as (0), extremely slight corrugation (defined as 1) to critical corrugation (defined as 5) after the backlight module is lightened for ten minutes.
Note 2:
corrugation number is determined, from the amount of the corrugation appearing cm the whole surface of luminance enhancement film after the backlight module is lightened for ten minutes.
Note 3:
corrugation level × corrugatian number indicates the rigidity and dimensional stability of luminance enhancement film; and the smaller me value is the better rigidity and dimensional stability of luminance enhancement film are.

Figure 6A:
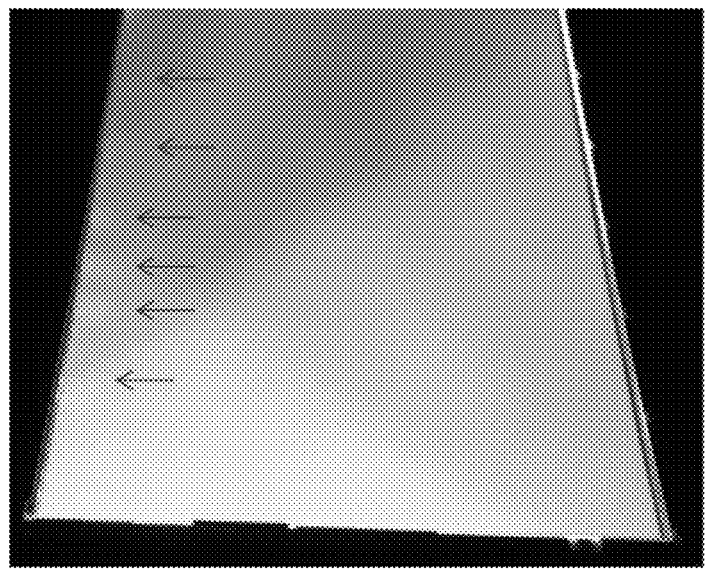
FIG. 6A is a diagram showing that the corrugations appear after the luminance enhancement film of Comparative Example 3 assembled in 12-inch backlight module is lightened for ten minutes.
Figure 6B:
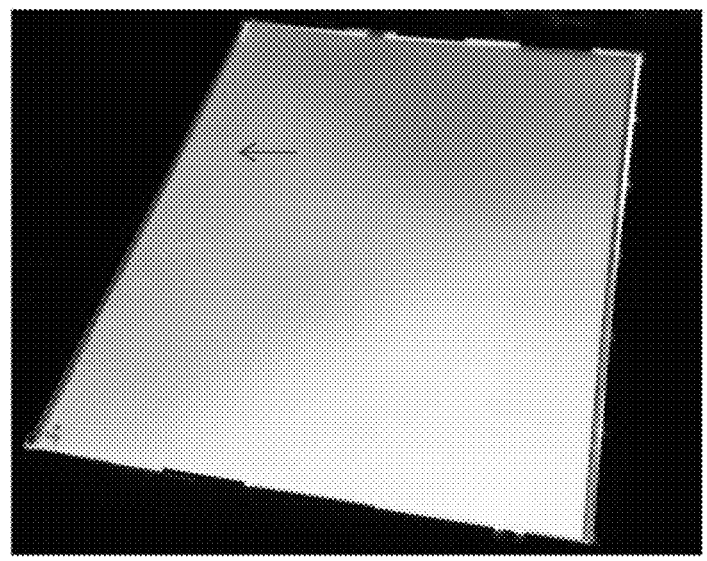
FIG. 6B is a diagram showing that the corrugation appears after the luminance enhancement film of Example 3 assembled in 12-inch backlight module is lightened for ten minutes.

As the results shown in Table 4, after being lightened in the backlight module is lightened for ten minutes, the luminance enhancement film of Comparative Example 3 obviously has insufficient heat resistance and dimensional stability due to lack of the reinforced layer, whereby it creates a very critical, corrugated deformation, as shown in FIG. 6A. In addition, after the backlight module of Comparative Example 1 is lightened for ten minutes, although the corrugating state of the luminance enhancement film is slightly improved due to the arrangement of the reinforced layer, said luminance enhancement film still tails to meet the deformation standard of product requirement. On the contrary, after the backlight modules of Examples 1 to 3 are lightened for ten minutes, the luminance enhancement films do not appear obvious corrugation (see FIG. 6B) because the Tg of the reinforced layers thereon is high enough to provide a sufficient heat resistance, dimensional stability and rigidity to the whole surface of said luminance enhancement films, and their corrugation level can meet the deformation standard of the product requirement.

(Test (2) for Luminance Enhancement Film Assembled in the Backlight Module).

The luminance enhancement films of Example 4 and Comparative Example 4 after cut in 14-inch in size are assembled in the 14-inch backlight module. After the backlight module is lightened for ten minutes, the luminance enhancement films are taken from the backlight module. The state and level of the corrugations on the surface of said films are observed and the results are listed in Table 5 below.

TABLE 5

|  | Example 4 | Comparative Example 4 |
|---|---|---|
| Thickness of reinforced layer (μm) | 5.0 ± 0.5 | 2.5 ± 0.5 |
| Corrugation: level | 0 | 4 |
| Corrugation number | 0 | 3 |
| Corrugation level × corrugation number | 0 | 12 |

Note:
corrugation level and corrugation number are estimated by the same way as Table 4.

Figure 7A:
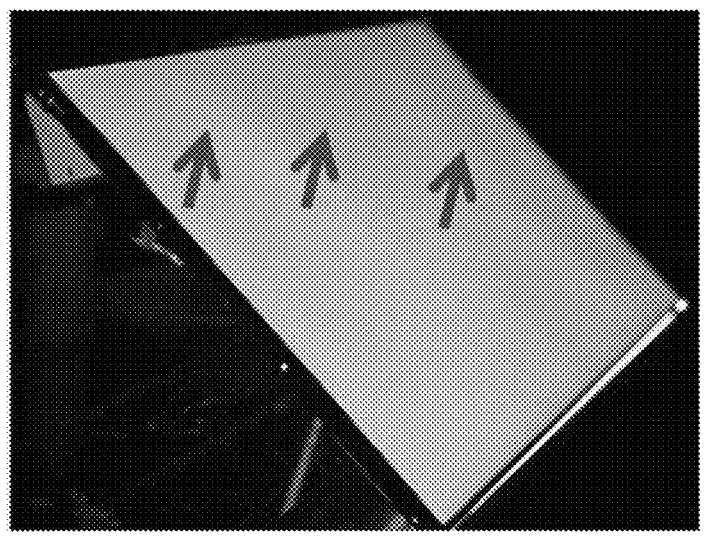
FIG. 7A is a diagram showing that the corrugations appear after the luminance enhancement film of Comparative Example 4 assembled in 14-inch backlight module is lightened for ten minutes.
Figure 7B:
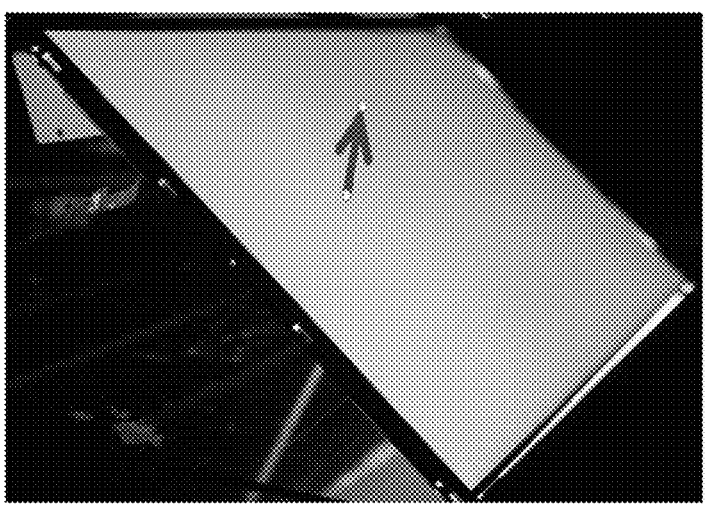
FIG. 7B is a diagram showing that the corrugation appears after the luminance enhancement film of Example 4 assembled in 14-inch backlight, module is lightened for ten minutes.

As the result shown in Table 5, after the backlight module of Comparative Example 4 is lightened for ten minutes, the heat resistance and dimensional, stability of said whole luminance enhancement film are insufficient due to the thinner reinforced layer, so that obvious corrugated deformation appears as shown, in FIG. 7A. On the contrary after the backlight module of Example 4 is lightened for ten minutes, the luminance enhancement film has no corrugation observed as shown in FIG. 7B.

The results shown above indicate that even though the reinforced layer has a sufficiently high Tg, it still needs to have a certain thickness in order to impart sufficient thermal stability and dimensional stability to the luminance enhancement film. For 14-inch backlight module, the thickness of the reinforced layer is necessary up to 5 μm to create an obvious effect.

(Test for Brilliance Gain)

The test for brilliance gain is performed by MB7 (SR-3AR) brightness meter. The display device assembled with any one of luminance enhancement film of Examples 1 to 3 and Comparative Examples 1 and 3 is measured and analyzed at room temperature. The result is listed in Table 6,

TABLE 6

|  | Gain | Refractive index of reinforced layer (before being cured) |
|---|---|---|
| Example 1 | 1.533 | 1.496 |
| Example 2 | 1.550 | 1.465 |
| Example 3 | 1.540 | 1.482 |
| Comparative Example 1 | 1.530 | 1.572 |
| Comparative Example 3 | 1.530 | — |

As known from the result in Table 6, the brilliance gains of the luminance enhancement films of Comparative Example 1 and Comparative Example 3 are 1.530. On the contrary, the brilliance of the luminance enhancement films of Examples 1 to 3 is in a gradually increasing trend accompanied with reducing refractive index of the reinforced layer, and particularly when the refractive index of the reinforced layer before being cured is 1.465 (Example 2), the brilliance gain of the luminance enhancement film becomes 2%. As known from this, the brilliance of the product will be increased when a resin with a low refractive index (RI) is used as reinforced layer on the back surface of the luminance enhancement film.

Although the preferred embodied aspects and embodiments are mentioned above to explain the present invention, the present invention is not limited to these embodiments. A person with ordinary knowledge in the art of course can make various variation and modification based on the disclosure of present invention, whereas such variation and modification are also included in the present invention.

For Example, although the content above mentions that the luminance enhancement film of present invention is adapted to an edge-lit backlight module, but present invention is not limited to this module. The luminance enhancement film of the present invention is also adapted to a direct-type backlight module and can provide the identical effect.

What is claimed is:

1. A luminance enhancement film, comprising:
   a support substrate having a first surface and a second surface opposite to the first surface;
   a prismatic structure comprising a plurality of prisms extending in a first direction, wherein the first surface of the support substrate supports the prismatic structure; and
   a homogeneous reinforced layer having a third surface and a fourth surface opposite to the third surface, wherein the third surface of the homogeneous reinforced layer is disposed on the second surface of the support substrate, wherein the homogeneous reinforced layer increases the rigidity of the luminance enhancement film without using the fourth surface of the homogeneous reinforced layer for connecting with another element, wherein the glass transition temperature (Tg) of the homogeneous reinforced layer is in the range from 80° C. to 250° C. and the thickness of the homogeneous reinforced layer is in the range from 3 µm to 50 µm.

2. The luminance enhancement film of claim 1, wherein the glass transition temperature (Tg) of the homogeneous reinforced layer is in the range from 100° C. to 200° C.

3. The luminance enhancement film of claim 1, wherein the refractive index of the homogeneous reinforced layer is in the range from 1.3 to 1.6.

4. The luminance enhancement film of claim 2, wherein the refractive index of the homogeneous reinforced layer is in the range from 1.3 to 1.6.

5. The luminance enhancement film of claim 1, wherein materials of the homogeneous reinforced layer are acrylic copolymers.

6. The luminance enhancement film of claim 5, wherein the acrylic copolymers are those copolymerized from aliphatic acrylic mono- or oligomers and aromatic multifunctional acrylic mono- or oligomers, or aromatic acrylic mono- or oligomers and aliphatic multifunctional acrylic mono- or oligomers.

7. The luminance enhancement film of claim 1, wherein the homogeneous reinforced layer comprises particles whose particle diameter is in the range from 1 µm to 20 µm.

8. The luminance enhancement film of claim 7, wherein the particles are selected from at least one of organic particles and inorganic particles.

9. The luminance enhancement film of claim 1, wherein a plurality of projecting bodies are formed on the surface of the homogeneous reinforced layer.

10. The luminance enhancement film of claim 9, wherein the shape of the projecting bodies is selected from at least one of triangle cylinder, irregular shape, semi-cylinder, hemispherical shape and semi-elliptical shape and wherein the arrangement between projecting bodies is regular or random.

11. The luminance enhancement film of claim 1, wherein the thickness of the support substrate is in the range from 25 µm to 300 µm.

12. The luminance enhancement film of claim 11, wherein the support substrate is selected from one of polyethylene terephthalate (PET), polycarbonate (PC), polyethylene naphthalate (PEN), (metallocene) cyclic olefin copolymer (mCOC), polyarylate (PAR), polyethersulfone (PES), triacetate cellulose (TAC) and polymethyl methacrylate (PMMA).

13. The luminance enhancement film of claim 1, wherein the glass transition temperature (Tg) of the homogeneous reinforced layer is larger than the glass transition temperature of the support substrate.

14. The luminance enhancement film of claim 1, wherein the third surface of the homogeneous reinforced layer is completely in contact with the second surface of the support substrate.

15. A luminance enhancement film, comprising:
    a support substrate having a first surface and a second surface opposite to the first surface;
    a prismatic structure comprising a plurality of prisms extending in a first direction, wherein the first surface of the support substrate supports the prismatic structure; and
    a homogeneous reinforced layer having a third surface and a fourth surface opposite to the third surface, wherein the third surface of the homogeneous reinforced layer is disposed on the second surface of the support substrate, wherein the homogeneous reinforced layer increases the rigidity of the luminance enhancement film without using the fourth surface of the homogeneous reinforced layer for connecting with another element.

16. The luminance enhancement film of claim 15, wherein the glass transition temperature (Tg) of the homogeneous reinforced layer is larger than the glass transition temperature of the support substrate.

17. The luminance enhancement film of claim 15, wherein the third surface of the homogeneous reinforced layer is completely in contact with the second surface of the support substrate.

18. A luminance enhancement film, comprising:
    a support substrate having a first surface and a second surface opposite to the first surface;
    a prismatic structure comprising a plurality of prisms extending in a first direction, wherein the first surface of the support substrate supports the prismatic structure; and
    a homogeneous reinforced layer having a third surface and a fourth surface opposite to the third surface, wherein the third surface of the homogeneous reinforced layer is disposed on the second surface of the support substrate, wherein the homogeneous reinforced layer increases the rigidity of the luminance enhancement film to avoid the deformation of the luminance enhancement film resulting from heat without using the fourth surface of the homogeneous reinforced layer for connecting with another element.

19. The luminance enhancement film of claim 18, wherein the glass transition temperature (Tg) of the homogeneous reinforced layer is larger than the glass transition temperature of the support substrate.

20. The luminance enhancement film of claim 18, wherein the third surface of the homogeneous reinforced layer is completely in contact with the second surface of the support substrate.

* * * * *